United States Patent [19]  [11] 4,428,146
Walker  [45] Jan. 31, 1984

[54] FISH BAIT DISPENSER
[76] Inventor: Wilbert L. Walker, R.D. #4, Box 267, Somerset, Pa. 15501
[21] Appl. No.: 405,298
[22] Filed: Aug. 4, 1982
[51] Int. Cl.³ .............................................. A01K 97/04
[52] U.S. Cl. ........................................................ 43/55
[58] Field of Search ................................... 43/55, 54.1
[56] References Cited
U.S. PATENT DOCUMENTS 2,443,861 6/1948 Johnston .................................. 43/55
2,518,590 8/1950 Andrist .................................... 43/55
2,518,986 8/1950 Griffith .................................... 43/55
2,763,956 9/1956 Olson ...................................... 43/55
2,787,080 4/1957 Wells ...................................... 43/55
2,857,705 10/1958 Woodcock ............................. 43/55

FOREIGN PATENT DOCUMENTS 716924 10/1966 Italy ..................................... 43/54.1

Primary Examiner—Gene P. Crosby
Attorney, Agent, or Firm—Jon M. Lewis

[57] ABSTRACT

One handed baiting of fish hooks is possible with use of a fish bait dispenser having an improved slotted hook baiting configuration.

4 Claims, 6 Drawing Figures

FISH BAIT DISPENSER

BACKGROUND OF THE INVENTION

It is known to provide dispensers for fish bait such as salmon eggs or the like. Such systems provide a container that will serve to protect the bait from spillage or damage while being stored prior to being placed on the fishing hook. Typical of such prior systems are those described in U.S. Pat. Nos. 2,443,861; 2,518,590; 2,518,986; and 2,763,956. As will become evident from the following description, none of the prior efforts possess the unique combination of advantages of this invention, in particular, with respect to the slotted hook baiting means.

SUMMARY OF THE INVENTION

This invention generally pertains to a container for holding and dispensing individual units of fish bait. The container includes an entry opening for receiving fish bait units into a holding area. The holding area is connected to a transfer area in a manner that will cause fish bait units to pass from the holding area into the trasfer area in an aligned manner. The transfer area is sized so as to accommodate fish bait in a single row and is generally perpendicularly connected to fish bait dispensing area. The fish biat dispensing area is positioned and sized so as to receive and hold one fish bait unit at a time from the transfer area. The dispensing area has an elongated area which is sized to contain one fish bait unit, a slot extending along the elongated axis of the dispensing area, and an exit opening for removal of the bait unit. This structure permits the user of the dispenser to insert a fish hook through the slot at a location proximate to the transfer area to engage a waiting fish bait unit. The hook is then passsed along the slot to the exit opening where the baited hook is removed from the dispenser opening.

DETAILED DESCRIPTION OF THE INVENTION

Figure 1:
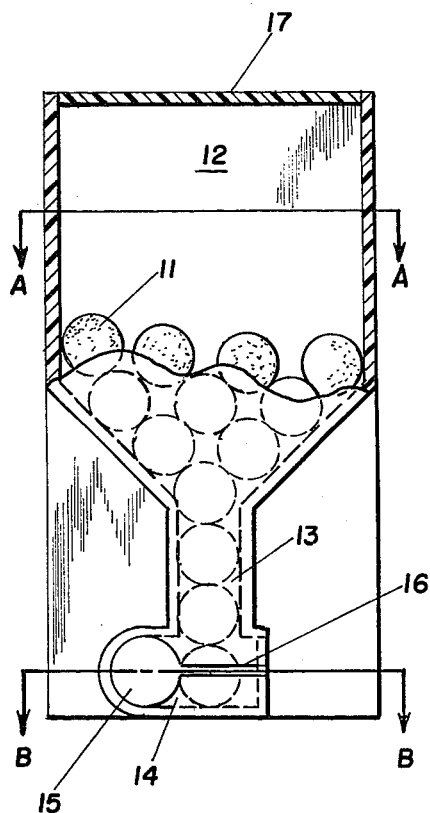
FIG. 1 is a front sectional view of the container.

The holding and dispensing container of the invention is useful in connection with fish bait such as salmon eggs, dough balls, cheeseballs, meatballs, liverballs, fish eggs, bread balls and the like. A preferred embodiment and the use of the invention is illustrated in the drawings. FIG. 1 is a front sectional view of the container illustrating the invention. This view depicts fish bait units 11 contained in holding area 12. The container may be constructed of wood, metal, phenolics, synthetics, and/or plastic materials. The units individually pass through transfer area 13 into elongated dispensing area 14 containing slot 16 for ultimate exist through exit opening 15. Lid 17 may be opened to feed bait units into holding area 12 and closed to prevent spillage of the bait.

Figure 2:
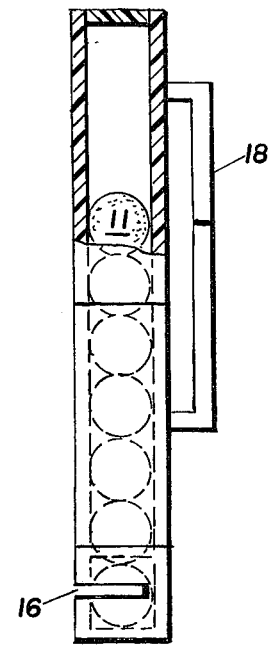
FIG. 2 is a side sectioned view of the container.

FIG 2 is a side sectional view of the container which depicts fastening bracket 18 which may be used to fasten the container to another object such as a belt or shirt pocket of the user.

Figure 3:
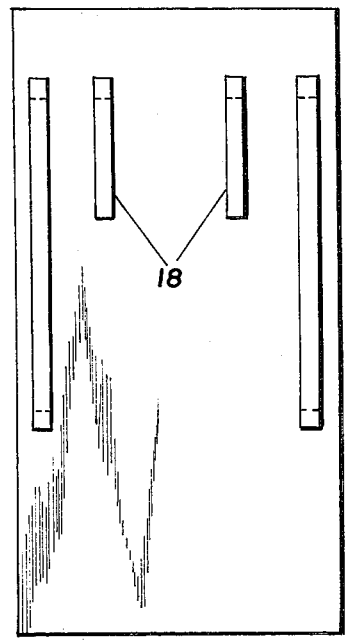
FIG. 3 is a back view of the container.

FIG. 3 is a back view of the container which further illustrates the bracket fixture of the intention.

Figure 4:
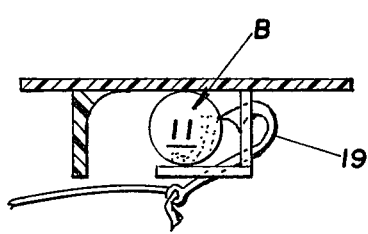
FIG. 4 is a sectional view of the container taken along line B—B of FIG. 1 illustrating engagement of a fish bait unit by a fishing hook.
Figure 5:
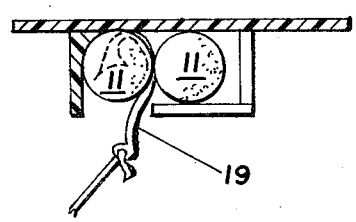
FIG. 5 is another sectional view of the container taken along line B—B of FIG. 1 illustrating removal of a baited fish hook.

FIG. 4 is a sectional view of the container taken along Line B—B of FIG. 1. This view shows fishing hook 19 engaged with fish bait 11 in an area located proximate to transfer area 13. Hook 19 is inserted into dispensing area 14 through slot 16. The hook is then passed along the slot to move bait 11 to exit opening 15 where the baited hook is removed from the container. This latter position is shown in FIG. 5 which is the same view as in FIG. 4.

Figure 6:
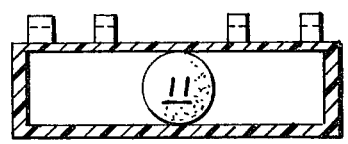
FIG. 6 is a sectional view taken along line A—A of FIG. 1.

FIG. 6 is a sectional view taken along line A—A of FIG. 1. This view further illustrates the invention.

The appropriate bait is put into the holding area and retained in this area with a lid which is a part of the container. The fish bait then passes single file under the influence of gravity through the transfer area into the dispensing area. This latter area is designed to retain the bait. A fish hook unattached or attached to a fishing line is then drawn through the slot. The fish hook comes into contact with the bait in the dispensing area. The fish hook then pulls the fish bait out into the end of the dispenser. The fish hook continues into the fish bait until the hook comes into contact with the end wall of the dispenser, with the hook being firmly embedded into the bait. The user then rotates the hook one quarter turn and pulls the hook with the fish bait firmly attached through the exit hole.

The design of the container permits another fish bait to drop by gravity into the dispensing area therefore permitting the user to repeat the above operation as desired.

The advantages of using this invention includes permitting the use to engage the fish bait onto the fish hook using only one hand. Normally two hands must be used following the customary method. The hooking device thus permits operation without undue waste of time and permits the users to use the other hand simultaneously for another purpose.

Another advantage of this device is there are no working or moving parts.

Because numerous modifications and changes will readily occur to those skilled in the art, it is not desired to limit the invention to the exact construction shown and described, and accordingly all suitable modifications and equivalents may be resorted to, falling within the scope of the appended claims.

I claim:

1. A container for holding and dispensing individual units of fish bait, comprising: a container having an entry opening for receiving fish bait units into a holding area, said holding area being connected to a transfer area in a manner that will cause fish bait units to pass from said holding area into said transfer area in an aligned manner, said transfer area being sized so as to accommodate fish bait units in a single row and being generally perpendicularly connected to an elongated fish bait unit dispensing area, said fish bait unit dispensing area being positioned and sized so as to receive and hold one fish bait unit at a time from said transfer area in an area proximate to said transfer area, said dispensing area having an elongated portion extending away from said proximate area and sized to contain one fish bait unit, a slot extending along an elongated axis of said dispensing area, and an exit opening for removal of said fish bait unit whereby a fish hook may be inserted through said slot at a location proximate to said transfer area to engage a waiting fish bait unit and then said hook passed along said slot until said exit opening is in alignment so as to be able to remove said engaged fish bait unit and hook from the dispenser opening.

2. The container of claim 1 which further includes closures means for closing the entry opening of the container.

3. The container of claim 1, which further includes fastening means attached to said container for fastening said container to another object.

4. The container of claim 1 or 3, wherein: said holding area is in the shape of a funnel and a lower end thereof sized so as to hold said fish bait units in a structure having a parallel configuration with a width of about one fish bait unit.

* * * * *